(12) United States Patent
Wang et al.

(10) Patent No.: US 7,551,555 B2
(45) Date of Patent: Jun. 23, 2009

(54) METHOD, SYSTEM AND PROGRAM PRODUCT FOR REGULATING DATA MESSAGING BY MOBILE STATIONS IN A WIRELESS NETWORK

(75) Inventors: Chung-Ching Michael Wang, Plano, TX (US); Ke-Chi Jang, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 720 days.

(21) Appl. No.: 10/903,982

(22) Filed: Jul. 30, 2004

(65) Prior Publication Data

US 2005/0041597 A1 Feb. 24, 2005

Related U.S. Application Data

(60) Provisional application No. 60/494,862, filed on Aug. 13, 2003.

(51) Int. Cl.
*H04L 12/26* (2006.01)
(52) U.S. Cl. .......................... 370/229; 370/392
(58) Field of Classification Search ......... 370/229–240, 370/392
See application file for complete search history.

(56) References Cited

U.S. PATENT DOCUMENTS

| | | | |
|---|---|---|---|
| 6,044,266 A * | 3/2000 | Kato ........................ 455/422.1 |
| 6,072,784 A * | 6/2000 | Agrawal et al. ............. 370/311 |
| 6,323,804 B1 * | 11/2001 | Kurby et al. ................ 370/316 |
| 6,330,451 B1 * | 12/2001 | Sen et al. .................... 370/229 |
| 7,079,845 B2 * | 7/2006 | Shively et al. .............. 370/329 |
| 2002/0055364 A1 | 5/2002 | Wang et al. |
| 2002/0080875 A1 * | 6/2002 | Tahara et al. ........... 375/240.02 |
| 2006/0063544 A1 * | 3/2006 | Zhao et al. ................. 455/510 |

FOREIGN PATENT DOCUMENTS

WO  WO 03/075597 A1  9/2003

OTHER PUBLICATIONS $3^{rd}$ Generation Partnership "3GPP2", *Upper Layer (layer 3) Signaling Standard for cdma2000 Spread Spectrum Systems—Release C*; May 28, 2002, pp. 3-704 & 3-705.

* cited by examiner

*Primary Examiner*—Hassan Kizou
*Assistant Examiner*—Joshua Smith
(74) *Attorney, Agent, or Firm*—Trop, Pruner & Hu, P.C.

(57) ABSTRACT

A communication network includes a base station in radio frequency communication with a mobile station. In order to regulate packet data messaging by the mobile station, the base station transmits a message over-the-air to the mobile station. The message indicates that the mobile station is to delay transmitting packet data messages and a duration of delay. In response to receipt of the message from the base station, the mobile station delays over-the-air transmission of packet data messages (e.g., Data Burst Messages) in accordance with the indicated duration.

42 Claims, 7 Drawing Sheets

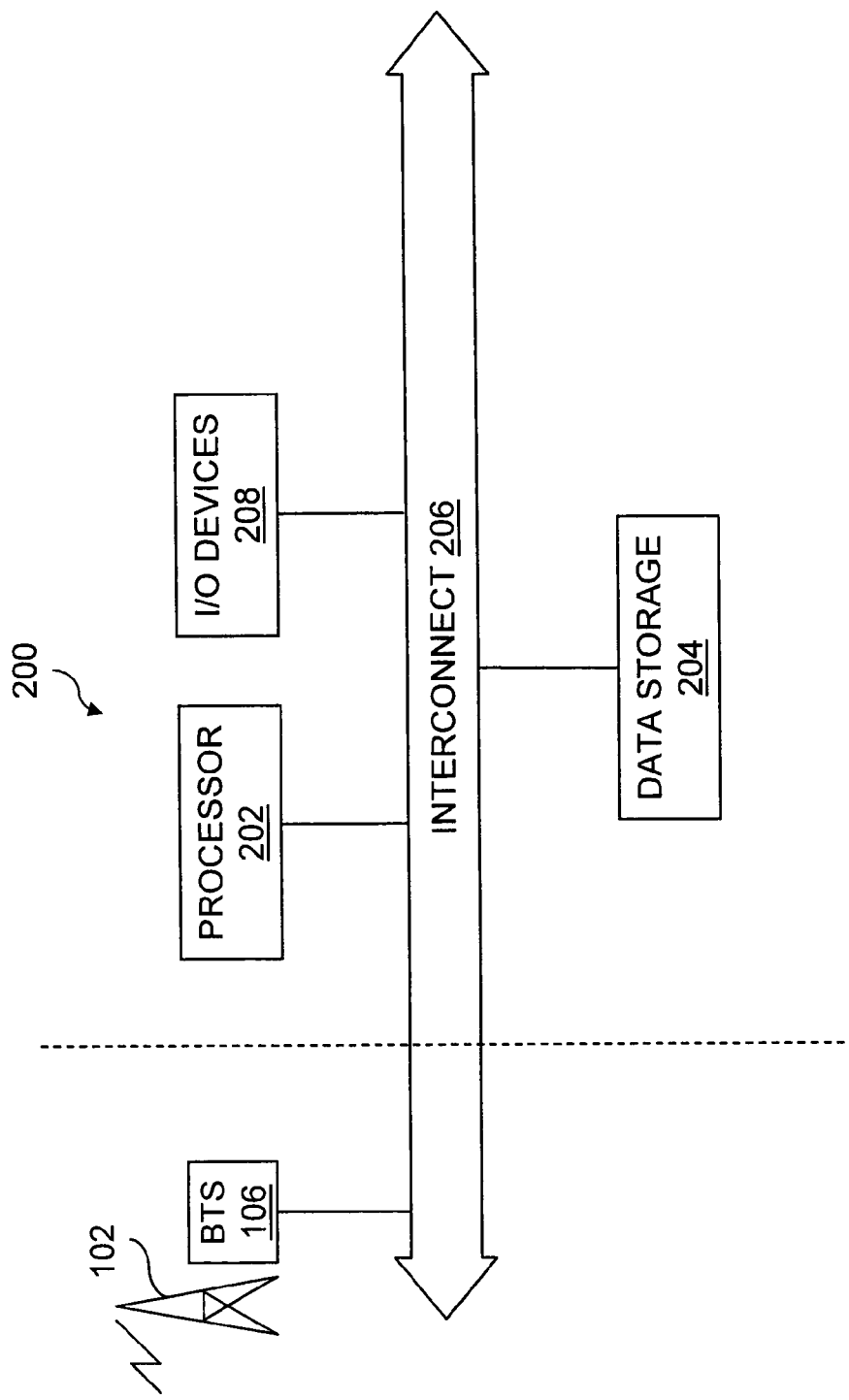

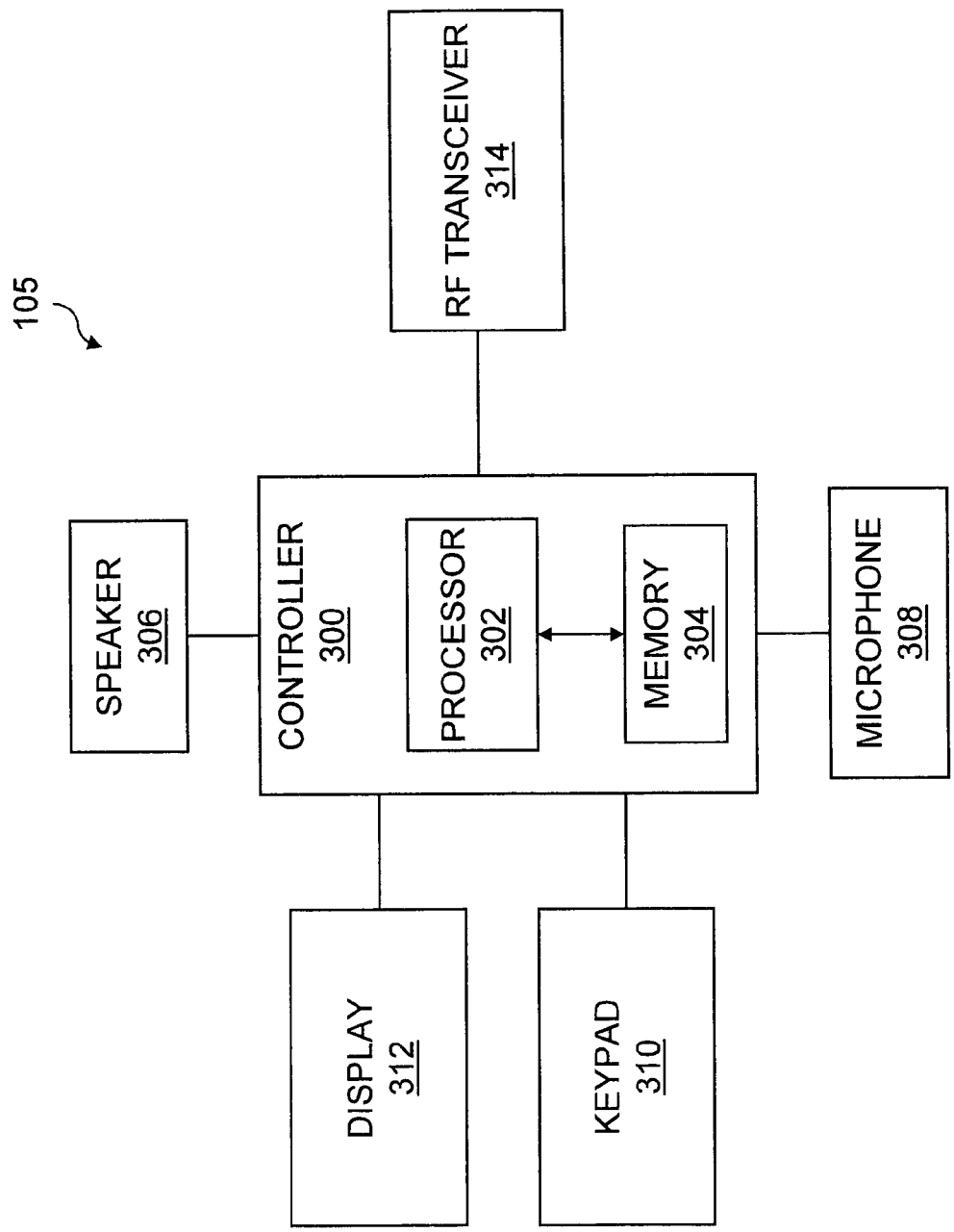

METHOD, SYSTEM AND PROGRAM PRODUCT FOR REGULATING DATA MESSAGING BY MOBILE STATIONS IN A WIRELESS NETWORK

PRIORITY CLAIM

The present application claims priority to U.S. patent application Ser. No. 60/494,862, filed Aug. 13, 2003 which is incorporated herein by reference in its entirety.

BACKGROUND OF THE INVENTION

1. Technical Field

The present invention relates in general to communication and, in particular, to methods, systems and program products for communication via a wireless communication network. Still more particularly, the present invention is related to methods, systems and program products for regulating data messaging by a mobile station in a wireless communication network.

2. Description of the Related Art

With the adoption of new digital technologies, over-the-air radio frequency (RF) communication provides an ever increasing number of voice and data services to users of mobile stations, such as digital pagers and mobile telephones. In order to permit interoperability of mobile stations between networks, standards organizations have promulgated a number of specifications to define required features and behaviors of access networks, core networks and network devices providing over-the-air RF communication. For example, the $3^{rd}$ Generation Partnership Project 2 (3GPP2) defines a number of specifications for communications employing the $3^{rd}$ generation (3G) Code Division Multiple Access (cdma2000) protocols, which support wireless voice and data services.

Among the many specifications promulgated by 3GPP2, is C.S0005-D v1.0 (TIA-2000.5-D), entitled "Upper Layer (Layer 3) Signaling Standard for cdma2000 Spread Spectrum Systems Release D," which is dated February 2004, is incorporated by reference herein in its entirety, and hereinafter referred to as the "Standard." As indicated by its title, the Standard specifies the signaling protocols and messaging format of network layer (Layer 3) communication in a cdma2000-compliant communication network.

The present invention recognizes that conventional wireless communication protocols, as exemplified by the Standard, do not support sufficient regulation of data messaging by mobile stations. For example, the Standard permits a base station to delay certain types of messaging by a mobile station (e.g., origination messages and resource requests), but does not support the regulation of data burst messages by individual mobile stations. As a result, when network or radio channel congestion occurs, a base station may not be able to appropriately process or respond to data burst messages, resulting in lost data and unnecessary utilization of airlink resources.

The present invention recognizes that it would be useful and desirable to reduce or eliminate such needless utilization of airlink resources by promoting improved regulation of data messaging by mobile stations.

SUMMARY OF THE INVENTION

In view of the foregoing and other shortcomings in the art, the present invention provides improved methods, systems and program products for communicating and/or controlling communication supporting enhanced regulation of data messaging by mobile stations.

In accordance with at least one embodiment of the present invention, a communication network includes a base station in radio frequency communication with a mobile station. In order to regulate packet data messaging by the mobile station, the base station transmits a message over-the-air to the mobile station. The message indicates that the mobile station is to delay transmitting packet data messages and a duration of delay. In response to receipt of the message from the base station, the mobile station delays over-the-air transmission of packet data messages (e.g., Data Burst Messages) in accordance with the indicated duration.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 2 is more detailed block diagram of a base station within the communication network of FIG. 1 in accordance with the present invention;

FIG. 3 is a more detailed block diagram of a mobile station within the communication network of FIG. 1 in accordance with the present invention;

DETAILED DESCRIPTION OF ILLUSTRATIVE EMBODIMENT

Figure 1:
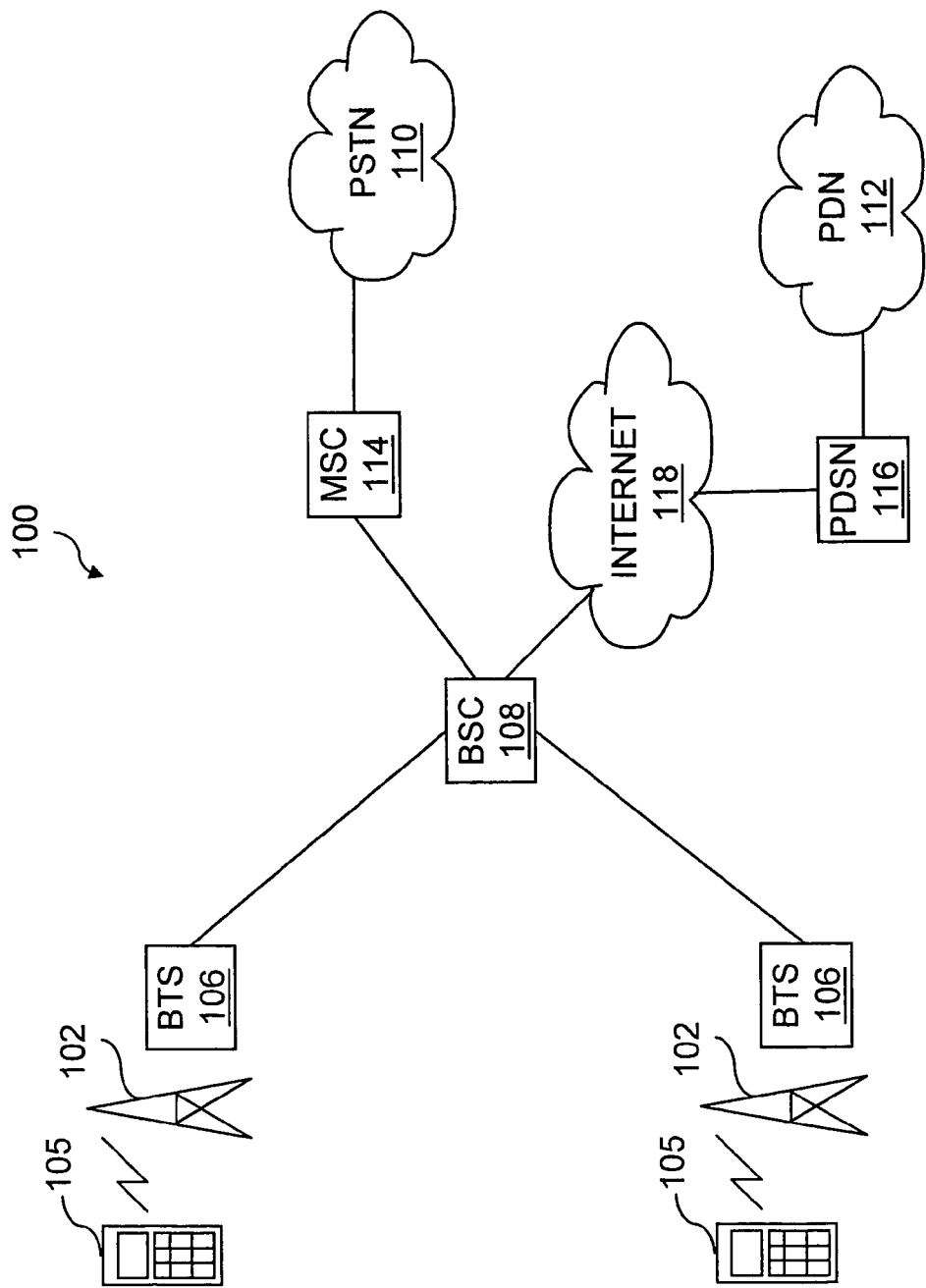
FIG. 1 is a high level block diagram of an exemplary communication network in which the present invention may advantageously be employed.

With reference to the figures and in particular with reference to FIG. 1, there is illustrated a high level block diagram of an exemplary communication network 100 in which the present invention may advantageously be implemented. As shown, communication network 100 comprises a number of geographically distributed transmission antennas 102, which transmit and receive radio frequency (RF) signals 104 to and from network entities including mobile stations (MSs) 105. RF signals 104, which may employ any of a number of signaling protocols, such as Code Division Multiple Access (CDMA) or Global System for Mobiles (GSM), are generated by base transceiver stations (BTSs) 106, which are each affiliated with a respective one of the transmission antennas 102. BTSs 106 are in turn coupled to and controlled by base station controller (BSC) 108. Coupled to BSC 108 are various network and communication terminals that originate and receive the communications transmitted over-the-air as RF signals.

For example, in the depicted embodiment, network terminals from which communications originate include circuit voice and data network (e.g., a public switched telephone network (PSTN)) 110 and packet data network (PDN) 112. In the illustrated embodiment, PSTN 110 is connected to BSC 108 via a land line and a mobile switching center (MSC) 114. PDN 112 is connected to BSC 108 via a Packet Data Serving Node (PDSN) 116 and the Internet 118. It is understood that both PSTN 110 and PDN 112 may comprise wireless devices (e.g., mobile telephones).

Within communication network 100, a network entity, such as a mobile station or BSC, may be the source and/or recipient of both data and voice communications. Additionally, like network entities may function as both sources and recipients of voice and data network communications.

Referring now to FIG. 2, there is depicted a more detailed block diagram of an exemplary base station (BS) 200 within communication network 100 in accordance with the present invention. As shown, BS 200 comprises a data processing system or processor (e.g., computer, router, switch and/or switching center) to communicate voice and/or data over-the-air with one or more mobile stations 105. BS 200 includes a processor 202 that controls (i.e., executes) operations in accordance with the present invention. Processor 200 may perform such operations under the control of software or firmware residing within data storage 204 (e.g., volatile and/or non-volatile storage) coupled to processor 202 by an interconnect 206 or received by processor 200 from a network interface unit or other Input/Output (I/O) device 208.

BS 200 further includes a base transceiver station (BTS) 106, coupled to processor 200 by interconnect 206, which operates as the carrier frequency controller. That is, BTS 106 allocates RF communication channels to voice and data traffic and routes such traffic to and from an antenna 102 coupled to BTS 106.

With reference now to FIG. 3, there is illustrated a more detailed block diagram of an exemplary mobile station 105 within communication network 200 in accordance with the present invention. As shown, mobile station 105 includes a controller 300 that generally includes a processor 302 and a memory 304. Processor 302 executes a control program stored within memory 304 to implement the subscriber unit side of the multiple-access protocol employed by communication network 100. Mobile station 105 further includes a speaker (ear piece) 306 by which controller 300 presents audio outputs to a subscriber and a microphone (mouth piece) 308 that receives audio inputs from the subscriber. Mobile station 105 also has a keypad 310 by which the subscriber can enter callee telephone numbers and other keyed inputs and a display 312 through which controller 300 can visually present alphanumeric and graphical outputs for viewing by the subscriber. Finally, mobile station 300 includes a radio frequency transceiver 314 for sending and receiving wireless signals, including the messaging described herein, over-the-air.

Although the invention may be implemented in communication networks supporting various protocols for RF communication, preferred embodiments of the invention will now be described in detail with reference to a CDMA network. In particular, preferred embodiments will be described with reference to a CDMA network implementing the Standard, which network utilizes Retry Order messages to regulate data burst messaging by particular mobile stations in communication with a base station of a wireless communication network.

Section 3.7.4.7 of the Standard defines a Retry Order message, which may be sent by a network entity (e.g., base station) on either the common channel or a traffic channel to indicate that a particular service is rejected and to specify a retry delay for the service. The fields within a conventional Retry Order message are summarized in Table I below.

TABLE I

| Order Specific Field | Length (bits) |
| --- | --- |
| ORDQ | 8 |
| RETRY_TYPE | 3 |
| RETRY_DELAY | 0 or 8 |
| RESERVED | 5 |

Of these conventional Retry Order fields defined by the Standard, the RETRY_TYPE field defines the type of service to be delayed.

In accordance with a preferred embodiment of the present invention, the types of services that may be specified by the RETRY_TYPE field are expanded to include additional services, such as data burst messages. The possible values of the RETRY_TYPE field may thus be expanded, as summarized in Table II.

TABLE II

| Binary Value | Retry Type | Usage |
| --- | --- | --- |
| 000 | Clear all | The Retry Order is used to clear any existent retry delay |
| 001 | Origination | The Retry Order specifies the RETRY_DELAY for a Packet Data Origination Message, Reconnect Message, or Enhanced Origination Message |
| 010 | Resource Request | The Retry Order specifies the RETRY_DELAY for a Resource Request Message or Resource Request Mini Message |
| 011 | Supplemental Channel Request | The Retry Order specifies the RETRY_DELAY for a Supplemental Channel Request Message or Supplemental Channel Request Mini Message |
| 100 | Short Data Burst | The Retry Order specifies the RETRY_DELAY for Short Data Burst |
| 101 | Origination and Short Data Burst | The Retry Order specifies the RETRY_DELAY for both Short Data Burst and Packet Data Origination Message, Reconnect Message, and Enhanced Origination Message |
| 110-111 | Reserved | |

In particular, as indicated by binary values '100' and '101', the RETRY_TYPE of a Retry Order message may specify data burst messages (DBMs) generally, or as shown in the particular embodiment of Table II, may specify a particular type of DBM (e.g., Short Data Burst or Short Message Service (SMS)) or a combination of a DBM and one or more other services or service requests. For example, the binary value '101' specifies a delay for Short Data Burst messages as well as Origination, Reconnect and Enhanced Origination Messages.

Thus, a BS experiencing traffic congestion or other inability to process DBMs (or other selected message types) transmitted by a MS may transmit a Retry Order message to the MS (on the common channel or a traffic channel) to regulate the transmission of DBMs by the MS. The MS, in response to receipt of such a Retry Order message, disables transmission of the specified message type(s) to the BS for a delay indicated by the RETRY_DELAY field of the Retry Order message. This delay, which may be enforced by reference to a countdown counter within the MS, may be a matter of seconds or minutes. Alternatively, the delay may be indefinite. The MS preferably indicates (e.g., via a text message presented within a display 312 of the MS) the type of service that has been disabled, and optionally, the duration of the retry delay. It will be appreciated that the delay imposed by the BS applies individually to the MS receiving the Retry Order message and not to all MSs in communication with the BS.

As indicated above in Table II, the Standard employs one value of the RETRY_TYPE try Order message (i.e., '000') to indicate that all retry delays previously imposed by the BS are to be cleared at the MS. In accordance with another aspect of the present invention, the values of the RETRY_TYPE field are further expanded to permit the BS to selectively remove retry delays for selected types of messaging (e.g., Resource Request and Origination messages) and to optionally retain retry delays imposed on the MS by the BS for one or more other types of messaging (e.g., DBMs). This further expansion of the values of the RETRY_TYPE field is shown in Table III below with the binary value '110'.

TABLE III

| Binary Value | Retry Type | Usage |
|---|---|---|
| 000 | Clear all | The Retry Order is used to clear any existent retry delay |
| 001 | Origination | The Retry Order specifies the RETRY_DELAY for a Packet Data Origination Message, Reconnect Message, or Enhanced Origination Message |
| 010 | Resource Request | The Retry Order specifies the RETRY_DELAY for a Resource Request Message or Resource Request Mini Message |
| 011 | Supplemental Channel Request | The Retry Order specifies the RETRY_DELAY for a Supplemental Channel Request Message or Supplemental Channel Request Mini Message |
| 100 | Data Burst | The Retry Order specifies the RETRY_DELAY for a Data Burst Message with BURST_TYPE indicating a Short Data Burst |
| 101 | Origination and Short Data Burst | The Retry Order specifies the RETRY_DELAY for both Short Data Burst and Packet Data Origination Message, Reconnect Message, and Enhanced Origination Message |
| 110 | Clear | The Retry Order is used to clear one or more extant retry delays |
| 111 | Reserved | |

In order to precisely specify which retry delays imposed by the BS on the MS are to be removed, the conventional Retry Order message represented in Table I is preferably augmented to include an optional NUM_TYPE_CLEAR field and, if it is present, one or more CLEAR_TYPE fields, as shown in Table IV.

TABLE IV

| Order Specific Field | Length (bits) |
|---|---|
| ORDQ | 8 |
| RETRY_TYPE | 3 |
| RETRY_DELAY | 0 or 8 |
| NUM_TYPE_CLEAR | 0 or 2 |
| {(NUM_RETRY_TYPE) | |
| CLEAR_TYPE | 0 or 3 |
| (NUM_RETRY_TYPE)} | |
| RESERVED | 0-7 (record is padded with '0's as needed to make the record octet-aligned) |

The NUM_TYPE_CLEAR field, which is preferably included within the Retry Order message only if RETRY_TYPE is set to '110' and is omitted otherwise, indicates the number of retry delay type(s) to be cleared by the Retry Order message. For example, in one implementation, the NUM_TYPE_CLEAR field is set by the BS to the number of retry delay types included in the Retry Order message minus one. In this implementation, if NUM_TYPE_CLEAR is included in the message, the BS also includes NUM_TYPE_CLEAR plus one occurrences of the CLEAR_TYPE field, each of which indicates the Retry Type (e.g., '001' through '101') for which the imposed delay is to be cleared. Of course, the BS should not set any CLEAR_TYPE field to '000' and '110' in the depicted embodiment because these Retry Types are assigned to Retry Types that clear retry delays.

In response to a Retry Order message with RETRY_TYPE set to '110', the MS clears the retry delay, if any, for each of the specifically identified Retry Types (but not necessarily all Retry Types). The MS may clear the retry delay by, for example, clearing a countdown timer within the MS utilized to enforce a retry delay imposed by the BS.

Figure 4A:
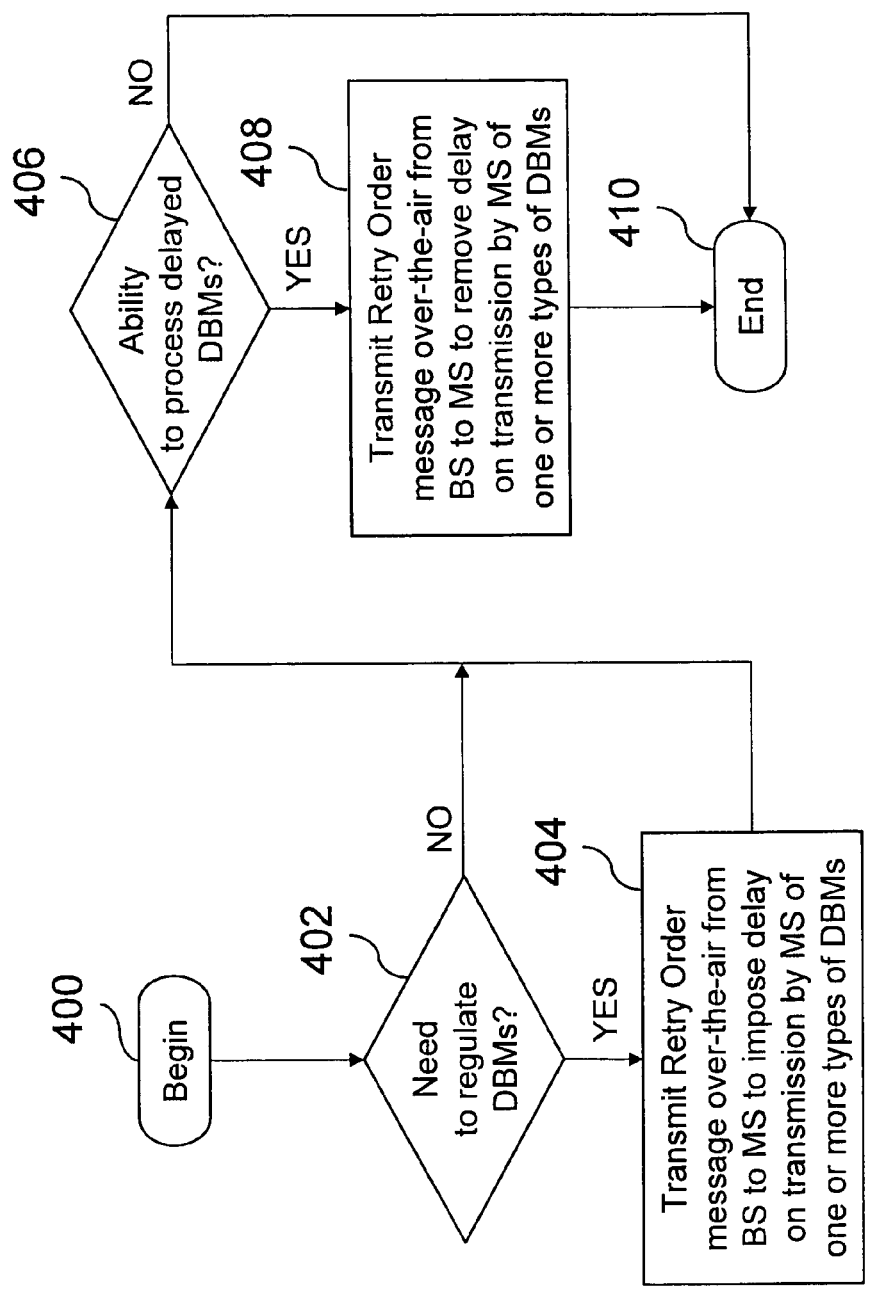
FIG. 4A is a high level logical flowchart of a process by which a base station within a wireless communication network regulates messaging by a mobile station utilizing a Retry Order message in accordance with a preferred embodiment of the present invention.

Referring now to FIG. 4A, there is illustrated a high level logical flowchart of a process by which a BS within a wireless communication network regulates messaging by a MS utilizing a Retry Order message in accordance with a preferred embodiment of the present invention. The illustrated process may be implemented, for example, as software or firmware stored within data storage 204 and executed by processor 202 of BS 200 of FIG. 2. Alternatively or additionally, the process may be implemented utilizing hardware circuitry within BTS 106 and/or processor 202. The illustrated process may be performed iteratively or in response to a dynamic network conditions or selected messaging patterns by one or more MSs.

As shown the process begins at block 400 and thereafter proceeds to block 402, which depicts the BS determining whether or not it should regulate the transmission by a MS of a particular message type, such as DBMs. This determination may be made, for example, by reference to a messaging frequency of the MS (either in general or with reference to the particular message type) and/or one or more other criteria, such as network or radio channel congestion. In response to a determination that the BS does not need to regulate DBMs, the process proceeds from block 402 to block 406, which is described below. If, on the other hand, the BS determines at block 402 that it needs to regulate transmission of DBMs by a MS, the process passes to block 404.

Block 404 depicts the BS transmitting a Retry Order message over-the-air to the MS in order to impose a retry delay for DBMs (or for a particular type of DBM, such as Short Data Burst or Short Message Service). As described above, the Retry Order message identifies DBMs in the RETRY_TYPE field and, in the RETRY_DELAY field, specifies a particular delay interval or an indefinite delay. Next, at block 406, the BS determines whether or not it has the ability to process particular messages (e.g., DBMs) from a MS upon which the BS has imposed a retry delay. If not, the process terminates at block 410. If, however, the MS now has the ability to process a message type upon which the BS has imposed a retry delay, the BS transmits a Retry Delay message to the relevant MS, as shown at block 408. The Retry Order message contains a RETRY_TYPE field set to signify either "Clear All" ('000') or "Clear" ('110') in order to remove one or more retry delays. As noted above, with the "Clear" RETRY_TYPE, the BS may remove fewer than all existing retry delays for the MS. Thereafter, the process terminates at block 410.

Figure 4B:
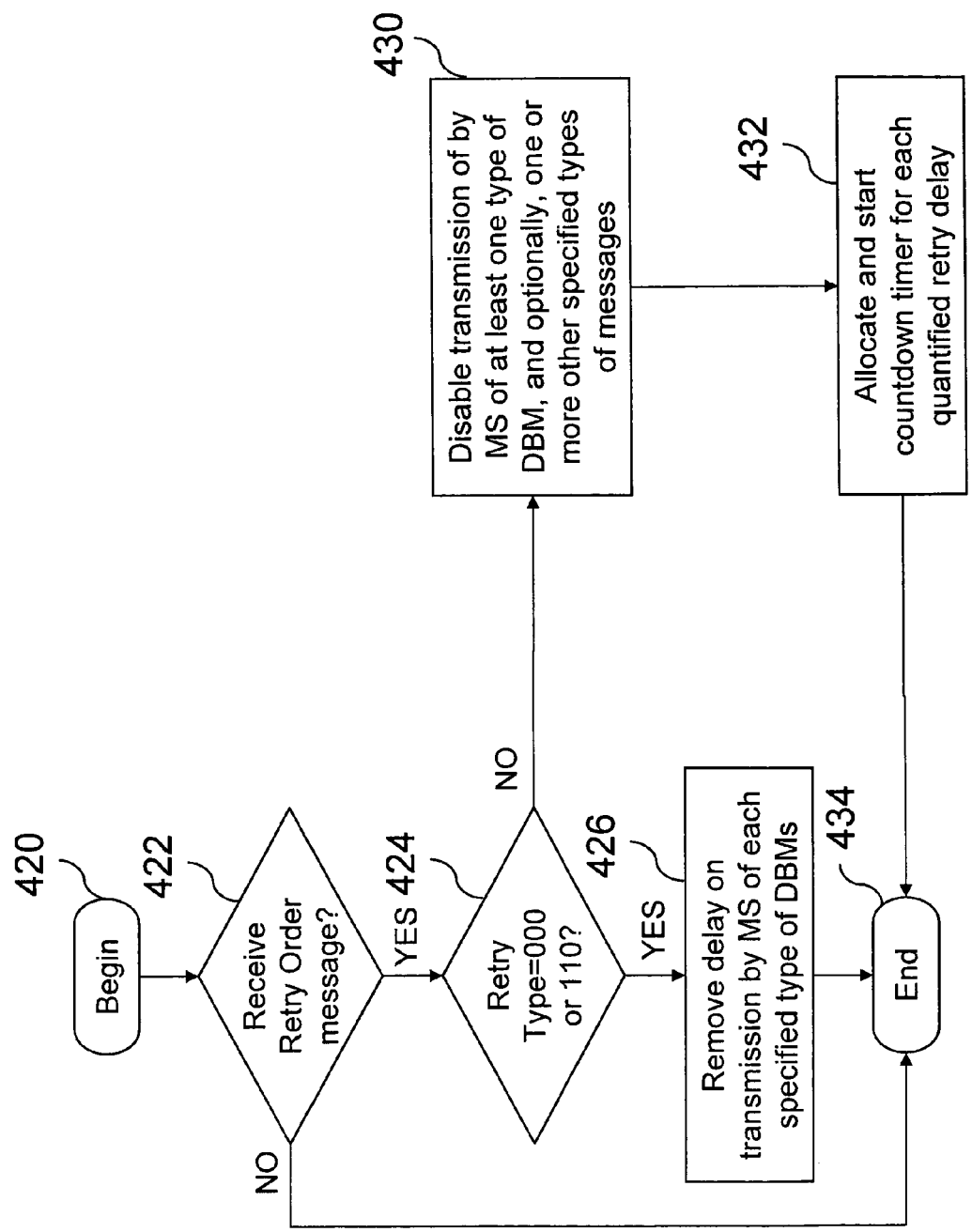
FIG. 4B is a high level logical flowchart of a process by which a mobile station in communication with a wireless communication network processes a Retry Order message in accordance with a preferred embodiment of the present invention.

With reference now to FIG. 4B, there is depicted a high level logical flowchart of a process by which a mobile station in communication with a wireless communication network processes a Retry Order message in accordance with a preferred embodiment of the present invention. As will be appreciated by those skilled in the art, the illustrated process may be implemented in hardware circuitry with controller 300 and/or RF transceiver 314 of MS 105, or alternatively or additionally, as software or firmware stored within memory 304 and executed by processor 302.

As shown, the process of FIG. 4B begins at block 420 and thereafter proceeds to block 422, which illustrates the MS determining whether or not a message received from the BS is a Retry Order message. If not, the process shown in FIG. 4B terminates at bock 434, and the MS processes the message in a conventional manner. If the MS determines at block 422 that the received message is a Retry Order message, the process proceeds to block 424, which illustrates the MS examining the Retry Type specified within the Retry Order message. If the Retry Type indicates that the Retry Order message is intended to clear a retry delay imposed by the BS (e.g., the Retry Type field is set to '000' or '110'), the process proceeds to block 426. Otherwise, the process passes from block 424 to block 430.

Referring now to block 426, the MS responds to a Retry Order message specifying a "Clear All" or "Clear" Retry Type by enabling the transmission by the MS of one or more message types indicated by the Retry Order message. The MS also resets the countdown counter(s), if any, allocated to measure the retry delay of the indicated message types. Thereafter, the process terminates at block 434.

With reference now to block 430, the MS processes a Retry Order message that specifies a retry delay for one or more message types (e.g., DBMs) by disabling transmission by the MS of the indicated message type(s). In addition, as shown at block 432, the MS allocates and starts a countdown counter for each retry delay quantified by the Retry Order message (i.e., the non-indefinite retry delays). The MS will be enabled to transmit the message types subject to retry delay after the earliest to occur of the expiration of the retry delay and the receipt of a Retry Order message clearing the retry delay. Thereafter, the process depicted in FIG. 4B terminates at block 434.

Figure 5A:
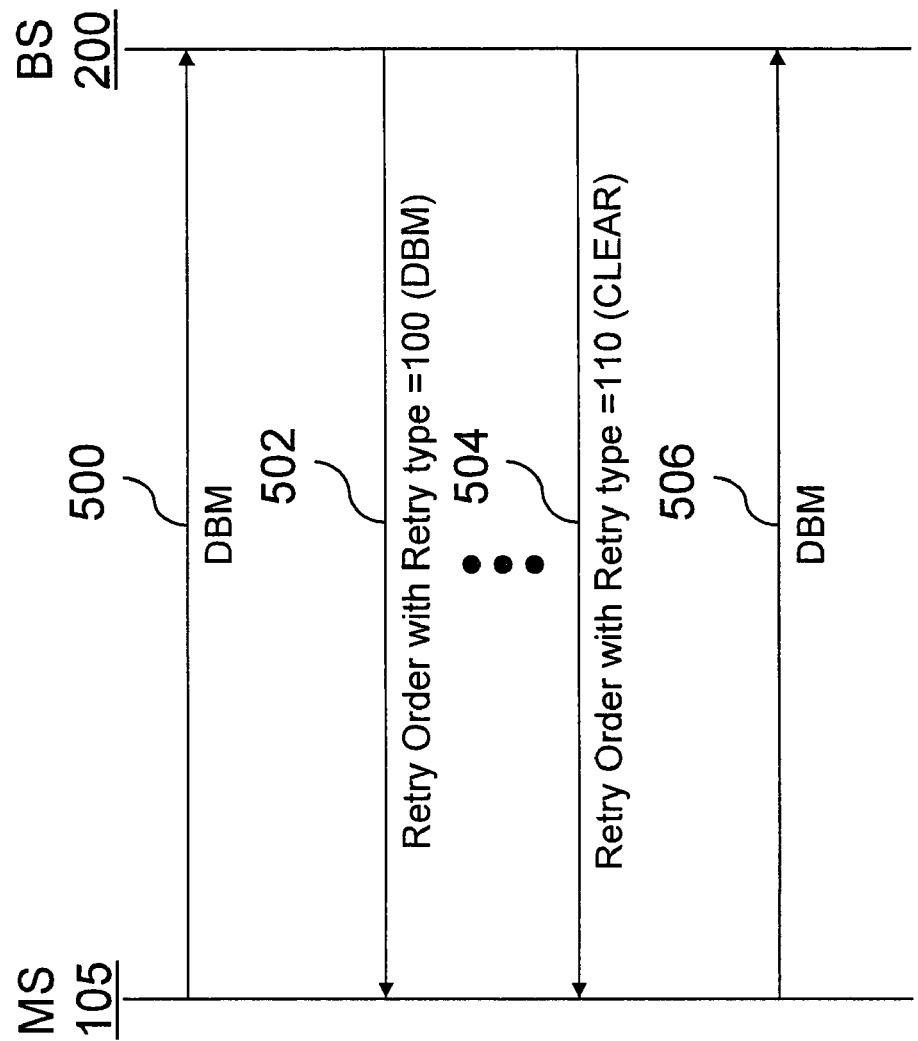
FIG. 5A is a first exemplary message flow in which messaging by a mobile station is regulated utilizing a Retry Order message in accordance with a preferred embodiment of the present invention.
Figure 5B:
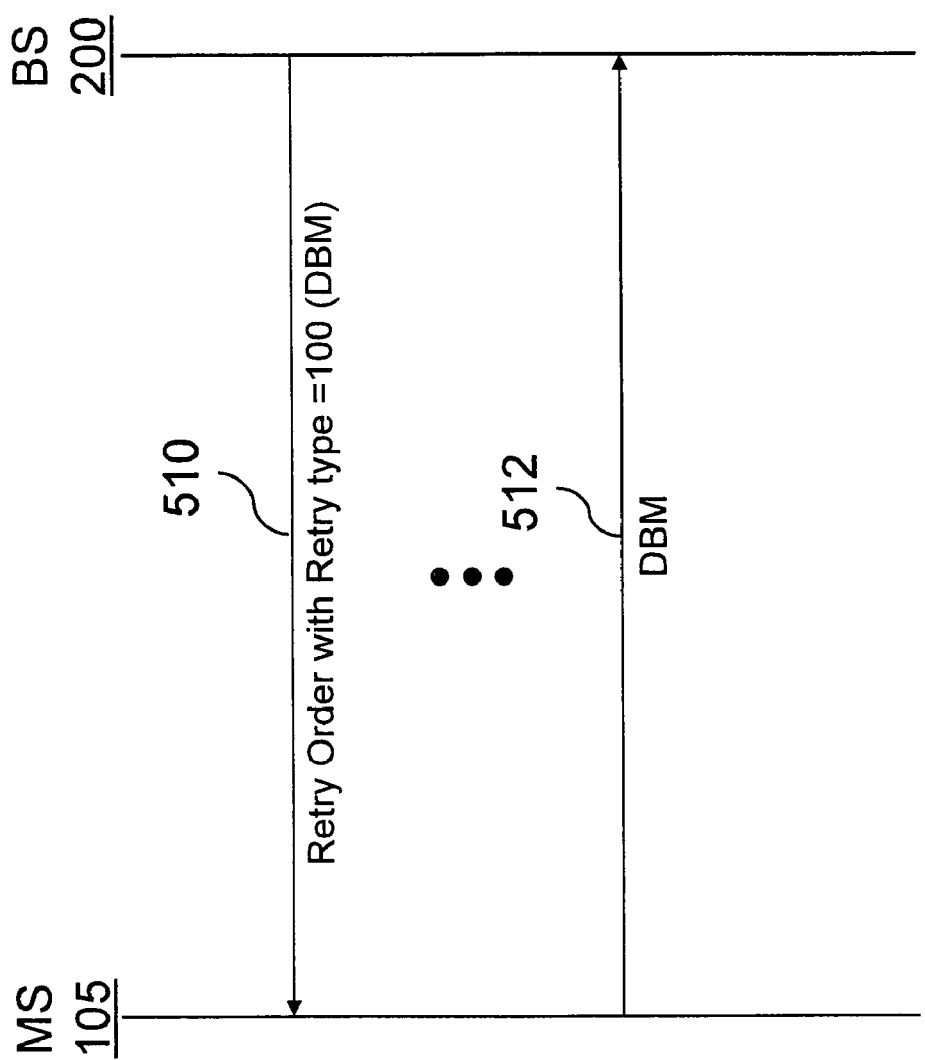
FIG. 5B is a second exemplary message flow in which messaging by a mobile station is regulated utilizing a Retry Order message in accordance with a preferred embodiment of the present invention.

Turning now to FIGS. 5A and 5B, there are illustrated two exemplary message flows in which data messaging by a MS is regulated utilizing a Retry Order message in accordance with the present invention. In FIG. 5A, MS 105 first transmits a DBM 500, such as a Short Data Burst, to BS 200. In response to being unable to process the DBM 500, for example, because of traffic channel or network congestion, BS 200 transmits a Retry Order message 502 to MS 105. As indicated, Retry Order message 502 contains a Retry Type field set to '100' in order to impose a retry delay on the transmission of DBMs by MS 105.

Thereafter, when BS 200 is again able to process DBMs, BS 200 transmits a second Retry Order message 504 to MS 105 in order to clear the retry delay. In the depicted scenario, Retry Order message 504 contains a Retry Type field set to '110' in order to clear only the retry delay for DBMs earlier imposed on MS 105. In response to Retry Order message 504, MS 105 clears the retry delay for DBMs and is therefore able to again transmit DBMs, such as DBM 506.

FIG. 5B illustrates a second message flow in accordance with a preferred embodiment of the present invention. In this message flow, BS 200 first transmits a Retry Order message 510 to MS 105 to impose a retry delay on the transmission of DBMs by MS 105. It should be noted that in the message flow of FIG. 5B, the retry delay is transmitted in response to detection of network congestion generally rather than in response to specific messaging by MS 105. The Retry Order message specifies a particular retry delay interval, which as described above, is timed by MS 105. After the expiration of the specified retry delay interval, MS 105 is again permitted to transmit DBMs, such as Short Data Burst 512. In the depicted message flow, no Retry Order message is transmitted by BS 200 to clear the retry delay for DBMs.

As has been described, the present invention provides improved methods, systems and program products for improved regulation of messaging by mobile stations in over-the-air communication with a base station in a wireless communication network. In accordance with the present invention, a BS can regulate transmission of one or more particular message types such as DBMs (or even particular types of DBMs, such as Short Data Bursts) by transmitting a message (e.g., Retry Order) to a MS. The disabling of the particular message can be of an indefinite or definite duration. The BS can also re-enable transmission of one or more message type(s) by the MS by transmitting to the MS an additional message (e.g., a Retry Order message). In one embodiment, the additional message may clear fewer than all messaging delays imposed by the BS on the MS.

While the invention has been particularly shown as described with reference to a preferred embodiment, it will be understood by those skilled in the art that various changes in form and detail may be made therein without departing from the spirit and scope of the invention. For example, although the present invention has been described with respect to a particular Standard and specified field names, it will be appreciated that the present invention is also applicable to wireless communication employing other standards and/or technologies and/or utilizing different fields and/or message to regulate messaging by mobile stations.

In addition, although aspects of the present invention have been described with respect to systems (e.g., mobile stations and base stations) executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), and rewritable storage media (e.g., a floppy diskette or hard disk drive).

What is claimed is:

1. A method of regulating messaging by a mobile station in a communication network, said method comprising:
    a mobile station receiving a first message over-the-air from a base station, said first message containing a field settable by the base station to one of a plurality of values to indicate a type of packer data messages that the mobile station is to delay transmitting and a duration of delay, wherein the field is settable to one of the plurality of values by the base station to indicate one of a plurality of types of packet data messages; and
    in response to receipt of the first message from the base station, the mobile station setting a delay time in the mobile station to delay over-the-air transmission of the indicated type of packet data messages in accordance with the indicated duration.

2. The method of claim 1, wherein said first message comprises a Retry Order message.

3. The method of claim 1, further comprising:
    said mobile station receiving a second message over-the-air from the base station, said second message indicating that said mobile station is to clear the delay time in transmitting the indicated type of packet data messages; and in response to receipt of said second message, said mobile station re-enabling over-the-air transmission of the indicated type of packet data messages to the base station by the mobile station.

4. The method of claim 3, wherein:

receiving the second message comprises receiving in the second message an indication that said mobile station is to clear less than all existing delay times imposed by said base station on messaging by said mobile station; and said re-enabling comprises re-enabling over-the-air transmission by the mobile station of the types of messages for which delay times imposed by the base station have been cleared.

5. The method of claim 1, wherein:

said indicated type of packet data messages comprises a type of data burst messages.

6. The method of claim 1, wherein:

the plural types of packet data messages include short data burst messages and short message service (SMS) messages.

7. The method of claim 1, and further comprising the base station transmitting said first message over-the-air to the mobile station.

8. A method of regulating messaging by a mobile station in a communication network, said method comprising:

a base station determining an inability to process at least one message; and in response to said determining, the base station transmitting a first message over-the-air to a mobile station, said first message containing a field set by the base station to one of a plurality of values to indicate that the mobile station is to delay transmitting one of a plurality of types of packet data messages and a duration of delay, wherein packet data messaging by the mobile station is regulated by the base station.

9. The method of claim 8, said determining comprising said base station detecting an inability to process a packet data message transmitted by the mobile station.

10. The method of claim 8, wherein said first message comprises a Retry Order message.

11. The method of claim 8, further comprising:

after transmitting said first message, said base station transmitting a second message over-the-air to the mobile station, said second message indicating that said mobile station is to clear a delay time in the mobile station in transmitting the indicated type of packet data messages.

12. The method of claim 11, wherein transmitting the second message comprises transmitting in the second message an indication that said mobile station is to clear less than all existing delay times imposed by said base station on messaging by said mobile station.

13. The method of claim 8, wherein said indicated type of packet data messages includes a type of data burst messages.

14. The method of claim 8, wherein said plural types of packet data messages include short data burst messages and short message service (SMS) messages.

15. The method of claim 8, and further comprising the mobile station, responsive to receipt of the message, delaying over-the-air transmission of the indicated type of packet data messages to the base station in accordance with the indicated duration.

16. A mobile station, comprising:

means for receiving a first message over-the-air from a base station, said first message containing a field settable by the base station to one of a plurality of values to indicate a type of packet data messages that the mobile station is to delay transmitting and a duration of delay, wherein the field is settable by the base station to one of the plurality of values to indicate one of a plurality of types of packet data messages; and means, responsive to receipt of the first message from the base station, for setting a delay time to delay over-the-air transmission of the indicated type of packet data messages in accordance with the indicated duration.

17. The mobile station of claim 16, wherein said first message comprises a Retry Order message.

18. The mobile station of claim 16, further comprising:

means for receiving a second message over-the-air from the base station, said second message indicating that said mobile station is to clear the delay time in transmitting the indicated type of packer data messages; and means, responsive to receipt of said second message, for re-enabling over-the-air transmission of the indicated type of packet data messages to the base station by the mobile station.

19. The mobile station of claim 18, wherein:

said means for receiving the second message comprises means for receiving in the second message an indication that said mobile station is to clear less than all existing delay times imposed by said base station on messaging by said mobile station; and said means for re-enabling comprises means for re-enabling over-the-air transmission by the mobile station of the types of messages for which delay times imposed by the base station have been cleared.

20. The mobile station of claim 16, wherein:

said types of packet data messages comprise types of data burst messages.

21. The mobile station of claim 16, wherein:

said types of packet data messages comprise short data burst messages and short service messages (SMS) messages.

22. A base station for a communication network, said base station comprising:

means for determining an inability to process at least one message; and means, responsive to determining an inability to process at least one message, for transmitting a first message over-the-air from to a mobile station, said message containing a field set by the base station to one of a plurality of values to indicate that the mobile station is to delay transmitting one of a plurality of types of packet data messages and a duration of delay, wherein packet data messaging by the mobile station is regulated by the base station.

23. The base station of claim 22, said means for determining comprising means for detecting an inability to process a packet data message transmitted by the mobile station.

24. The base station of claim 22, wherein said first message comprises a Retry Order message.

25. The base station of claim 22, further comprising:

means for, after transmitting said first message, transmitting a second message over-the-air to the mobile station, said second message indicating that said mobile station is to clear a delay time in transmitting the indicated type of packet data messages.

26. The base station of claim 25, wherein said means for transmitting the second message comprises means for transmitting in the second message an indication that said mobile station is to clear less than all existing delay times imposed by said base station on messaging by said mobile station.

27. The base station of claim 22, wherein said types of packer data messages comprise types of data burst messages.

28. The base station of claim 27, wherein said types of packer data messages comprise short data burst messages and short message service (SMS) messages.

29. A communication network comprising:
a base station in accordance with claim 22; and
a mobile station that, responsive to receipt of the first message. delays over-the-air transmission of the indicated type of packet data messages to the base station in accordance with the indicated duration.

30. A program product for a mobile station, said program product comprising a computer-readable storage medium containing software that when executed cause a processor in the mobile station to:
receive a first message over-the-air from a base station, said first message containing a field settable by the base station to one of a plurality of values to indicate a type of packet data messages that the mobile station is to delay transmitting and a duration of delay, wherein the field is settable to one of the plurality of values by the base station to indicate one of a plurality of types of packet data messages; and
responsive to receipt of the first message from the base station, set a delay time in the mobile station to delay over-the-air transmission of the indicated type of packet data messages in accordance with the indicated duration.

31. The program product of claim 30, wherein said first message comprises a Retry Order message.

32. The program product of claim 30, wherein said software when executed cause the processor in the mobile station to further:
receive a second message over-the-air from the base station, said second message indicating that said mobile station is to clear the delay time in transmitting the indicated type of packet data messages; and
responsive to receipt of said second message, re-enable over-the-air transmission of the indicated type of packet data messages to the base station by the mobile station.

33. The program product of claim 32, wherein:
receiving the second message comprises receiving in the second message an indication that said mobile station is to clear less than all existing delay times imposed by said base station on messaging by said mobile station; and
wherein re-enabling the over-the-air transmission comprises re-enabling over-the-air transmission by the mobile station of the types of messages for which delay times were imposed by the base station have been cleared.

34. The program product of claim 30, wherein:
said indicated type of packet data messages comprise a type of data burst messages.

35. The program product of claim 30, wherein:
the plural types of messages include short data burst messages and short message service (SMS) services.

36. A program product for a base station in a communication network, said program product comprising a computer-readable storage medium containing software that when executed cause a processor in the base station to:
determine an inability to process at least one message; and
responsive to determining an inability to process at least one message, transmit a first message over-the-air to a mobile station, said first message containing a field set by the base station to one of a plurality of values to indicate that the mobile station is to delay transmitting one of a plurality of types of packet data messages and a duration of delay, wherein packet data messaging by the mobile station is regulated by the base station.

37. The program product of claim 36, wherein determining the inability comprises detecting an inability to process a packet data message transmitted by the mobile station.

38. The program product of claim 36, wherein said first message comprises a Retry Order message.

39. The program product of claim 36, wherein said software that when executed cause the processor in the base station to further:
after transmitting said first message, transmit a second message over-the-air to the mobile station, said second message indicating that said mobile station is to clear a delay lime in the mobile station in transmitting the indicated type of packet data messages.

40. The program product of claim 39, wherein transmitting the second message comprises transmitting in the second message an indication that said mobile station is to clear less than all existing delay times imposed by said base station on messaging by said mobile station.

41. The program product of claim 36, wherein said indicated type of packet data messages includes a type of data burst messages.

42. The program product of claim 41, wherein said plural types of packet data messages include short data burst messages and short message service (SMS) messages.

\* \* \* \* \*